United States Patent [19]

Greenspan

[11] 4,247,589

[45] Jan. 27, 1981

[54] DECORATIVE OXIDATION PROCESS AND ARTICLE

[76] Inventor: Donald J. Greenspan, 235 Pavilion Ave., Riverside, N.J. 08075

[21] Appl. No.: 861,245

[22] Filed: Dec. 16, 1977

[51] Int. Cl.[3] .......................... B32B 15/04; B05D 1/36

[52] U.S. Cl. ................................ 428/209; 148/6.14 R; 427/205; 428/242; 428/457; 428/469; 428/472

[58] Field of Search ............... 428/195, 209, 457, 469, 428/472, 242; 427/90, 205; 148/6.14 R

[56] References Cited

U.S. PATENT DOCUMENTS

| | | | |
|---|---|---|---|
| 3,765,931 | 10/1973 | Kyri et al. | 428/469 X |
| 3,926,564 | 12/1975 | Giaever | 428/469 X |
| 3,958,070 | 5/1976 | Schintlmeister et al. | 428/209 |
| 4,072,771 | 2/1978 | Grier | 428/209 X |
| 4,105,812 | 8/1978 | Campbell | 428/16 |

*Primary Examiner*—Thomas J. Herbert, Jr.

*Attorney, Agent, or Firm*—Seidel, Gonda, Goldhammer & Panitch

[57] ABSTRACT

A process for making a decorative article is provided by selectively oxidizing at least one layer of oxidizable metal to produce color changes in the layer(s) and selectively terminating the oxidation of the metal to set the color in the layer(s) with the desired decorative effect. Preferably, the oxidizable metal is in the form of finely divided particles such as iron, copper or brass powder, which may be adhesively or cohesively secured to a substrate which is preferably porous. Oxidation may be carried out by wetting the metal with a corrosive liquid or humidity in an oxygen containing atmosphere, and the rate and extent of oxidation may be controlled mechanically by occlusive dressings and/or chemically by the use of catalysts. The resulting article exhibits predetermined color patterns characteristic of various stages of oxidation of the metal.

34 Claims, 7 Drawing Figures

FIG. 1
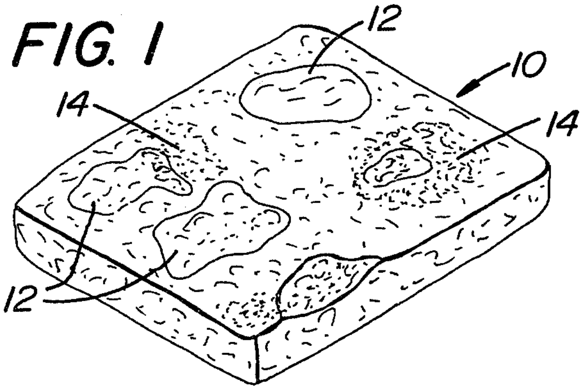
FIG. 2
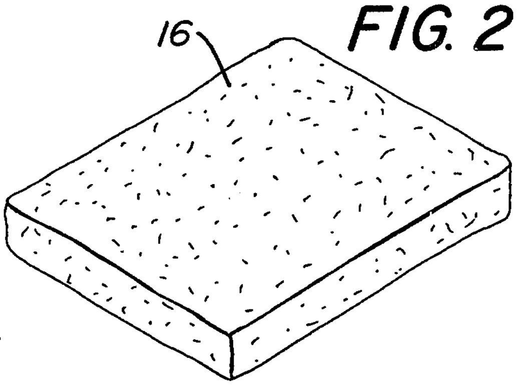
FIG. 3
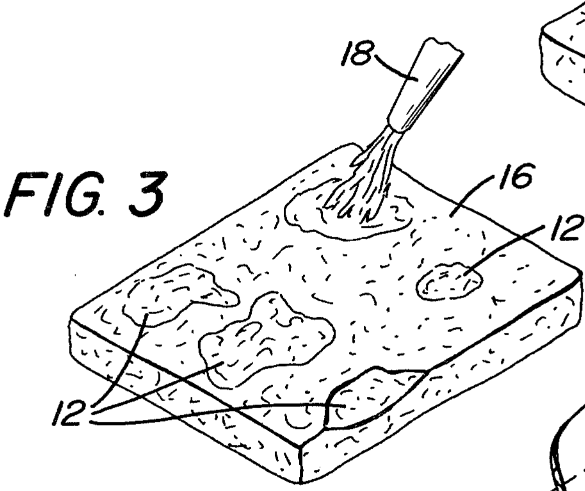
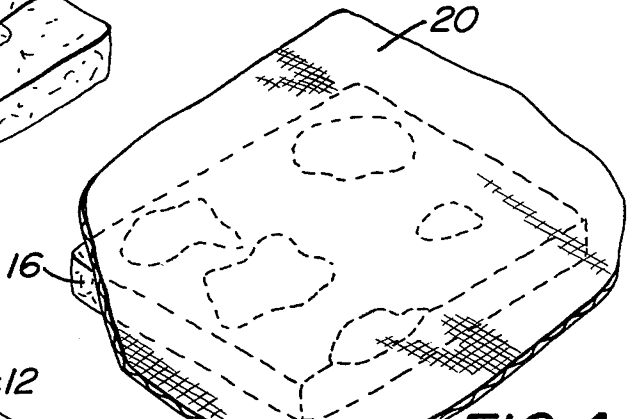
FIG. 4
FIG. 5
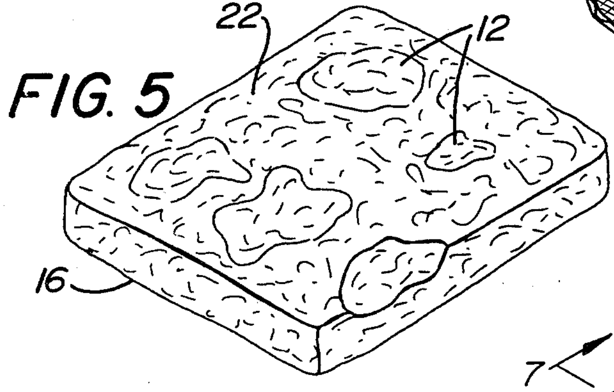
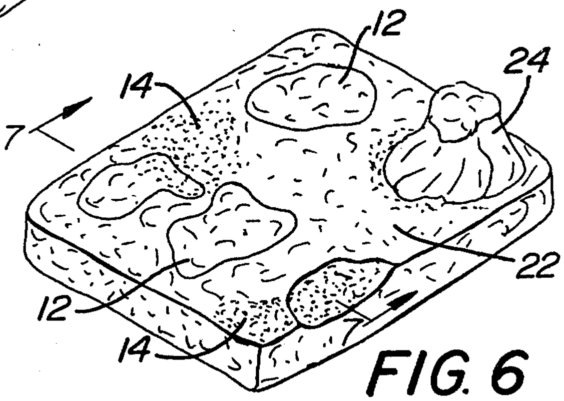
FIG. 6
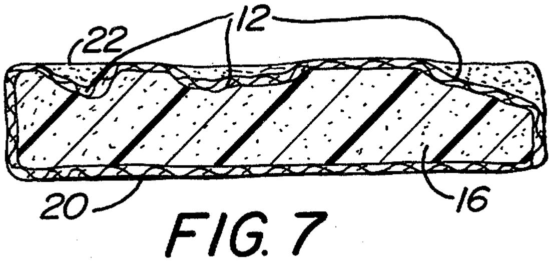
FIG. 7

DECORATIVE OXIDATION PROCESS AND ARTICLE

BACKGROUND OF THE INVENTION

The present invention relates to a decorative oxidation process and article. More particularly, the invention is directed to methods for making decorative articles by selectively oxidizing metal to produce color changes, and resulting decorative articles having color patterns characteristic of various stages of metal oxidation.

Artwork and decorative articles employing natural earth colors, including oranges, browns, yellows and reds are currently very popular. Such artwork includes both abstract art and simulated primitive art. Such art attempts to use natural materials in order to obtain the natural earth colors.

It is known to make use of natural processes to produce artwork having earth colors. For example, metal sculptures have been made in which the outer surface has been allowed to oxidize in order to produce a desired color effect. An example of this is the large Oldenburg "Clothespin" sculpture in Philadelphia which is made of "COR-TEN" steel which has been allowed to oxidize (rust) to produce an organish-brown color.

However, the use of such natural processes is time consuming, non-reproducible, and does not usually lend itself to mass production. It would therefore be desirable to have a process for producing artwork or decorative articles having earth colors in which the natural processes are accelerated, but can be controlled to make the artwork at least approximately reproducible for the purposes of mass or multiple production. An important feature of the present invention is the control of color changes, as contrasted to the uncontrolled or random weathering or corrosion of prior art metal sculpture.

BRIEF DESCRIPTION OF THE INVENTION

According to the present invention, decorative articles and methods of producing the same are provided in which a layer or layers of an oxidizable metal are selectively oxidized to produce color changes in the layer(s), and the oxidizing process is then selectively terminated to set the colors in the layer(s) with the desired decorative effect. The resulting decorative article exhibits predetermined color patterns characteristic of various stages of the oxidation of the metal. The metal is preferably in the form of finely divided particles of elemental metals, metal salts, compounds, alloys and metals with combined impurities, preferably multivalent metals such as iron, copper and brass.

The metal particles may be adhesively or cohesively secured to a substrate, which preferably has a porous surface. The oxidation of the metal includes wetting the metal with a corrosive liquid, such as water, acid, base or electrolyte solutions, or humidity, in the presence of an oxygen containing atmosphere. The rate and extent of oxidation may be controlled by at least partially covering the metal with occlusive (i.e., absorbent dressings), or chemically treating the metal with catalysts.

The oxidation step may be terminated simply by drying the oxidized metal and coating the oxidized metal with an at least partially transparent sealant to prevent further oxidation. In a particularly preferred embodiment, metal particles, such as iron powder, are sprinkled in thin layers on a relatively smooth substrate of plaster of Paris which may be reinforced with a fabric matrix. During oxidation of the metal particles, portions of the surface may be covered with wet paper towels (occlusive dressings). The wet paper towels keep the contacted portions wet and speed the oxidation in those portions of the article.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a schematic representation in perspective view illustrating a finished decorative article according to one embodiment of the present invention.

FIGS. 2 through 6 are schematic representations in perspective view illustrating various steps in the production of a decorative article in accordance with one embodiment of the present invention.

FIG. 7 is a cross sectional elevation view taken along line 7—7 of FIG. 6.

DETAILED DESCRIPTION OF A PREFERRED EMBODIMENT

Referring to the drawings in detail, there is shown in FIG. 1 a decorative article, designated generally as 10, in perspective view. The details of the decorative article 10 and method of producing the article are illustrated schematically in greatly simplified form for ease of explanation and description, and are not intended to illustrate any particular artistic design. Thus, the decorative article may take any desired shape or form, and may include various surface contours, including depressions 12 and elevations 14.

Referring now to FIGS. 2 through 6, a preferred method according to the present invention will now be described for producing the decorative article illustrated in FIG. 1. The article may be formed on a base 16 which may have any desired shape or form for supporting the decorative material. Base 16 may be made of any desirable material, such as wood, metal, plastic, glass, polymeric foam, etc. Base 16 may be rigid or flexible, porous or non-porous, flat or contoured. However, it is preferred that the base 16 be relatively rigid to prevent excessive manipulation of the decorative material, relatively non-porous to prevent excessive absorption of the corrosive oxidizing liquid, and relatively flat to obtain optimal light reflection from the decorative surface.

A preferred base 16 comprises a sheet or slab of polymeric foam, preferably a closed cell polystyrene foam, which has been shown in FIG. 2 as a regular rectangular block of relatively rigid foam having a thickness of about one inch.

If desired, base 16 may be provided with surface contours such as depressions 12 to give the article an undulating surface. In the case of a polymeric foam base, such depressions may be conveniently formed by localized heating, such as with a blowtorch 18, or other heating device, as illustrated in FIG. 3.

Base 16 is preferably covered with a porous matrix 20, as shown in FIG. 4, which serves as a substrate for the oxidizable metal particles used to form the decorative effect. The porous matrix may advantageously comprise plaster of Paris, which has the characteristic of providing a smooth but porous surface to which the oxidizable metal may cohere. The plaster of Paris may be provided with reinforcement, such as a non-metallic fabric. A satisfactory form of such plaster of Paris comprises conventional sheets of casting plaster used in orthopedics, in which an open mesh fabric or gauze is impregnated or coated with plaster of Paris (calcium sulfate).

The casting plaster may be easily wrapped around base 16 by first wetting the plaster and then stretching the fabric around the foam base and allowing to dry so that the plaster sets the covering in place around the base.

Base 16 with porous matrix 20 is next provided with a layer 22 of oxidizable metal for forming the decorative surface of the article. The layer 22 of oxidizable metal may comprise any of a large number of different forms of metal, such as powder, shavings, turnings, wire, fragments, steel wool, screening, sintered particles, etc. However, it is preferred that the layer of oxidizable metal be relatively thin so that it will adhere or cohere rather closely to the substrate and provide optimum light reflection to enhance color contrasts. Layer(s) 10 mils or less are preferred.

The oxidizable metal may comprise elemental metals, metal salts, compounds and alloys, metals with combined impurities, etc. In short, virtually any metal which is readily oxidizable and produces color changes upon oxidation will be satisfactory for use in the present invention. Preferred oxidizable metals are the multivalent metals which have several oxidation states yielding several different colors. Iron, copper and brass are among the preferred multivalent metals, but the invention is not limited to any of these.

The layer of oxidizable metal is preferably provided in the form of a powder of finely divided particles. If desired, an adhesive may be provided on the base or substrate to secure the particles to the substrate. However, normally an adhesive is not required since the powder particles will cohere to the surface pores of the substrate, and oxide formation between adjacent particles will improve the cohesive bond.

The metallic particles are preferably wetted with a liquid such as water to form a paste or slurry which is then spread on the substrate in desired configurations and thicknesses. As shown in FIG. 5, the layer 22 of oxidizable metal covers substantially the entire surface of the porous matrix substrate 20. If desired, the particles may be built up in thickness to form elevations 14 on some areas of the substrate (see FIGS. 1 and 6). However, it is generally preferred that the layer of metal particles be kept relatively thin, such as on the order of 1–3 particles thick, in order to allow the greatest and most rapid oxidative effect.

If desired, the oxidizable metal particles may be applied to the substrate in dry form by sprinkling the powder particles on the substrate. However, if this method is employed, care must be taken in subsequently wetting the powder particles since the wetting liquid may wash the particles away and change the configuration and thickness of the metal layer. In such a case, wetting of the metal particles may be performed by subjecting the article to steam or a very humid atmosphere.

Various designs, patterns or decorative effects may be provided in the metal layer either before, during or after the oxidation of the metal, as desired. For example, very light or bare areas may be provided by scraping or otherwise removing metal particles from the substrate at various stages or by applying the particles through stencils or by masking certain areas of the substrate during application of the metal particles. Other possible effects will be readily apparent to those skilled in the art, and need not be discussed in any further detail. The oxidation of the metal layer may be achieved by wetting the metal with a corrosive liquid in the presence of an oxygen-containing atmosphere. Depending upon the particular oxidizable metal, the corrosive liquid may be water, acid, base, electrolyte solutions, or a combination of these. Where the oxidizable metal is iron or an iron containing material, the corrosive liquid may be simply water or steam or a humid atmosphere. Where the oxidizable metal is copper or brass or other metals, acids such as sulfuric acid should be used in order to obtain a suitable oxidation rate. Of course, where acids or bases are used as the corrosive liquid, care must be taken to select a substrate and/or base which will not materially deterioriate when subjected to the acid or base.

The corrosive liquid may be applied to the metal as the wetting liquid before application of metal particles to the substrate. This will start the oxidative process at an early stage, and in fact a certain amount of preoxidation of the metal particles may be carried out prior to application of the particles to the substrate. Alternatively, the corrosive liquid may be applied to the particles only after the layer of oxidizable metal is formed on the substrate.

The selective oxidation of the metal may continue until the desired color changes are achieved. This may take 24 to 48 hours or more depending upon the particular metals, the particular corrosive liquid and the control conditions. Thus, as the corrosive liquid evaporates or is absorbed by materials adjacent to the metal, the corrosive liquid must be replenished in order to keep the oxidation process going. It is for this reason also that it is preferred that the base for the decorative article be non-porous, so that a minimum of the corrosive liquid is absorbed by the base. That is, the more corrosive liquid is drawn away from the metal, the slower the oxidation process, and the more often the corrosive liquid will have to be replenished.

The rate and extent of oxidation in various areas of the metal layer may be controlled in various manners, mechanically and/or chemically. For example, areas of the metal may be partially covered or contacted with occlusive (absorbent) dressings. For example, portions of the metal may be covered with moisture-containing material, such as wet paper towels 24, as shown in FIG. 6. The paper towels maintain the supply of corrosive liquid adjacent the metal and thereby speed the oxidation process. After the desired effect is achieved, the paper towels or other occlusive material is removed. If desired, dry dressings or other absorbent materials could be used to remove corrosive liquid or block oxygen from the metal to slow oxidation.

Alternatively, the rate of oxidation may be controlled catalytically by applying catalysts to the metal, either to accelerate or decelerate the oxidation reaction. Similarly, the oxidation could be slowed by providing another chemical which competes with the oxidation reaction so that the oxidation is slowed.

Further, the extent or rate of oxidation can be controlled simply by drying the metal in selected areas to terminate the oxidation process in some areas while the oxidation process continues in other areas. When it is desired to terminate the entire oxidation process, the whole metal layer is simply dried by evaporation of the corrosive liquid. If an acid or base is used as the corrosive liquid, it may be desirable to neutralize the acid or base prior to the drying step. The method of drying the decorative article is not crucial, and may be carried out by heating in an oven, placing in a vacuum chamber, treating the surface with streams of hot air, etc. After the drying, selected areas of the metal layer may be rewetted to continue the oxidation process for touch-up purposes or to achieve additional decorative effects.

After the decorative article is completely dried and no further oxidation of the metal surface is desired, the oxidized metal layer is preferably coated with a sealant which is at least partially transparent, and may or may not have coloring materials therein. Thus, if a sealant is not applied, the decorative article may change in color over a period of time as the metal is further oxidized by humidity and various pollutants in the air surrounding the decorative article. Sealant also protects particles from abrasion.

The sealant should be one which does not adversely react with the layer of oxidized metal, but shields the metal from oxygen, humidity and various pollutants in the air. I have found for example that various hair sprays and commercially available sealers and stain finishes are suitable sealants. On the other hand, certain vinyl sprays are not satisfactory since they tend to muddy the color of the oxidized metal.

The sealant may be applied by brush, spray, dipping or any other suitable method. However, spraying is preferable, so long as the force of the spray is not too strong, since brushing or dipping may tend to dislodge some of the oxidized metal particles.

After the sealant has been applied, various other coatings may be applied over the sealer for additional protection or to provide various effects. For example, vinyl sprays, lacquers, etc. can be applied over the sealant to make the surface shiny, smooth, highly reflective, etc.

A particularly suitable oxidizable metal for use in the present invention is commercially available iron powder which comprises 98% iron and trace amounts of various impurities. Whereas pure iron corrodes slowly, it is believed that impurities in the iron accelerate the corrosion process. Similarly, since oxidation or rusting occurs slowly at room temperature, an electrolyte such as sodium chloride or mineral acids such as hydrochloric or sulfuric acids may be used to accelerate the corrosion. Dust particles and other pollutants in the atmosphere also greatly enhance the oxidation process. As the rusting or oxidation of the iron powder proceeds, oxide forms on the surface of the particles resulting in bridging from one particle to the next. In this manner a lattice work is established which enhances the strength of the metal layer as well as the cohesion of the metal layer to the substrate.

Preferably this oxidation and bridging is allowed to proceed for 10 or 20 minutes before applying any occlusive dressing over the iron. By overlapping the occlusive dressings or having the dressings not touch in certain areas, the oxidation process is caused to proceed at different rates. In addition, the occlusive dressings affect the texture of the surface of the metal layer. Thus, the weight of the water applied on top of the occlusive dressings has a tendency to mat down the underlying metal surface making it smoother in texture than portions which are not contacted by occlusive dressings.

Where the occlusive dressing is matted flat against the iron particles, the rust assumes a lighter color and also a smoother, non-textured finish. By overlapping occlusive drressings, one can establish a rhythmic harmony of color tone and variations in the oxidation color spectrum including reds, oranges and yellows. Black, green and dark brown colors, which are established early in the rusting process, can also be achieved.

As indicated previously, various suitable bases and substrate materials may be used. Alternatively, in certain cases where the metal layer may be made self-sustaining, no substrate or base may be needed at all. However, the metal layers will normally be quite brittle, especially after oxidation and bridging, and some sort of substrate or base is desirable. Where a flexible fabric is used as the substrate, without a rigid base, the decorative article may be used as draperies, wall coverings, wall hangings, etc.

Where the base or substrate is very smooth and non-porous, coherence of the metal layer to the substrate or base will be poor, and an adhesive will be desirable. The adhesive may be porous or non-porous, and the substrate could be covered with an adhesive tape prior to applying the metal layer.

The resulting decorative articles of the present invention may take many forms and have many different uses, as desired. Due to the predominance of earth colors from the rusting of iron and the oxidation of other metals, the process may be used for example to simulate stone slabs or tablets bearing primitive art. Other possible uses will readily suggest themselves to those skilled in the art in view of the preceding disclosure.

The present invention may be embodied in other specific forms without departing from the spirit or essential attributes thereof and, accordingly, reference should be made to the appended claims, rather than to the foregoing specification as indicating the scope of the invention.

I claim:

1. A method for making a decorative article comprising the steps of:

a. providing a base on which said decorative article is formed, b. securing a layer of particles of an oxidizable metal to said base, c. selectively oxidizing said metal at least while said particles are in position in said layer, said oxidizing comprising wetting the metal particles with a liquid corrosive to said metal to cause formation of oxides on at least portions of said particles to produce color changes in the layer and to cause bridging by oxide formation between adjacent particles, and d. selectively terminating the oxidizing of said metal by removing said liquid to set the color in the layer with the desired decorative effect having zones of different colors.

2. Method according to claim 1 wherein said particles are adhesively secured to the base.

3. Method according to claim 1 wherein the step of oxidizing said metal comprises subjecting the metal to a humid, oxygen-containing atmosphere.

4. Method according to claim 1 wherein subsequent to terminating the oxidizing step, the oxidized metal is coated with an at least partially transparent sealant to prevent further oxidation.

5. Method according to claim 1 wherein the step of oxidizing said metal is controlled chemically by the use of catalysts applied to the metal.

6. Method according to claim 1 wherein said oxidizable metal has a form selected from the group consisting of elemental metals, metal salts, compounds and alloys, and metals with combined impurities.

7. Method according to claim 6 wherein said oxidizable metal is a multivalent metal selected from the group consisting of iron, copper and brass.

8. Method according to claim 1 wherein said base is covered with a a substrate to support said layer of partices of oxidizable metal.

9. Method according to claim 8 wherein said oxidizable metal is in the form of finely divided particles.

10. Method according to claim 9 wherein said particles are secured to the substrate by cohesion in the surface pores of the substrate and oxide formation between adjacent particles.

11. Method according to claim 9 wherein said particles are sprinkled on said substrate as a dry powder in desired configurations and thicknesses.

12. Method according to claim 9 wherein said particles are wetted and applied to the substrate as a paste or slurry in the desired configurations and thicknesses.

13. Method according to claim 8 wherein the substrate comprises a porous matrix.

14. Method according to claim 13 wherein said porous matrix comprises a non-metallic fabric.

15. Method according to claim 14 wherein said fabric is supported by a relatively rigid base.

16. Method according to claim 15 wherein said base has an uneven surface such that the decorative article will simulate a stone slab.

17. Method according to claim 15 wherein said base is relatively non-porous.

18. Method according to claim 15 wherein said base comprises a polymeric foam.

19. Method according to claim 18 wherein said base is a closed-cell polystyrene foam.

20. Method according to claim 18 including the step of selectively heating said foam to produce surface contours thereon.

21. Method according to claim 1 wherein the step of oxidizing said metal comprises wetting said metal with a corrosive liquid in the presence of an oxygen-containing atmosphere.

22. Method according to claim 21 wherein the step of terminating the oxidation of the metal comprises drying the oxidized metal.

23. Method according to claim 21 wherein said corrosive liquid is selected from the group consisting of water, acid, base and electrolyte solutions.

24. Method according to claim 21 including the step of controlling the rate and extent of oxidation of the metal in at least a portion of the layer while the metal is in contact with said corrosive liquid, said controlling step comprising at least partially covering the metal with occlusive dressings.

25. Method according to claim 24 wherein said occlusive dressings comprise water-containing moisture absorbent material, and subsequently removing said moisture absorbent material.

26. Method for making a decorative article comprising the steps of:

a. providing a base on which said decorative article is formed,
b. providing a porous fabric matrix over said base,
c. applying oxidizable iron-containing particles to said matrix,
d. selectively subjecting said iron-containing particles to moisture and an oxygen-containing atmosphere for sufficient periods of time to at least partially oxidize the iron and produce color changes on the matrix,
e. selectively terminating the oxidation of the iron to set the color on the matrix with the desired decorative effect, and
f. sealing the particles against further oxidation.

27. Method according to claim 26 wherein said porous fabric matrix is impregnated or coated with an anhydrous water-absorbing substance.

28. Method according to claim 27 wherein said anhydrous substance comprises plaster of Paris.

29. A decorative article comprising a base, a layer of metal particles secured to said base, said metal particles being in various stages of oxidation, whereby the layer exhibits predetermined color patterns characteristic of the stages of oxidation, said particles forming a lattice by bridging of the oxides of the metal between adjacent particles, and said metal particles and the oxides thereof are sealed against further oxidation.

30. A decorative article according to claim 29 wherein said base is covered with a substrate to which said particles are secured by cohesion and the oxide formed between adjacent particles.

31. A decorative article according to claim 30 wherein said substrate comprises a porous matrix of plaster of Paris for retaining said metal particles.

32. A decorative article according to claim 31 wherein said plaster of Paris is provided with a non-metallic fabric reinforcement.

33. A decorative article according to claim 31 wherein said substrate is secured to a relatively rigid base, said metal particles are iron, and the article simulates a stone slab bearing primitive art.

34. A method for making a decorative article comprising the steps of:

a. providing a base on which said decorative article is formed,
b. securing a layer of an oxidizable metal to said base,
c. selectively forming oxides on at least portions of said metal by wetting the metal with a liquid corrosive to said metal to produce color changes in the layer,
d. selectively controlling the rate and extent of oxide formation in at least a portion of the layer by at least partially covering the metal with moisture absorbent material wetted with a liquid corrosive to said metal,
e. selectively terminating the oxide formation on the metal to set the color in the layer with the desired decorative effect having zones of different colors, and
f. removing said moisture absorbent material.

* * * * *